United States Patent
Jaeger et al.

(10) Patent No.: US 7,195,748 B2
(45) Date of Patent: Mar. 27, 2007

(54) PROCESS FOR THE PRODUCTION OF HYDROGEN PEROXIDE

(75) Inventors: Bernd Jaeger, Darmstadt (DE); Thomas Haas, Frankfurt (DE); Jürgen Glenneberg, Offenbach (DE); Jürgen Grunert, Freigericht (DE)

(73) Assignee: Degussa AG, Düsseldorf (DE)

( * ) Notice: Subject to any disclaimer, the term of this patent is extended or adjusted under 35 U.S.C. 154(b) by 362 days.

(21) Appl. No.: 10/476,202

(22) PCT Filed: Mar. 4, 2003

(86) PCT No.: PCT/EP03/02181

§ 371 (c)(1),
(2), (4) Date: May 19, 2004

(87) PCT Pub. No.: WO03/082735

PCT Pub. Date: Oct. 9, 2003

(65) Prior Publication Data

US 2005/0063896 A1    Mar. 24, 2005

(30) Foreign Application Priority Data

Mar. 28, 2002 (EP) .................................. 02007120

(51) Int. Cl.
*C01B 15/023* (2006.01)
(52) U.S. Cl. .................................................. 423/588
(58) Field of Classification Search ................ 423/588, 423/589, 590
See application file for complete search history.

(56) References Cited

U.S. PATENT DOCUMENTS

| | | | |
|---|---|---|---|
| 2,657,980 A | 11/1953 | Spranger et al. ............. | 423/590 |
| 2,867,507 A * | 1/1959 | Gleason, Jr. et al. ........ | 423/589 |
| 2,966,398 A | 12/1960 | Jenney ........................ | 423/588 |
| 2,993,760 A * | 7/1961 | Broun, Jr. et al. .......... | 423/588 |
| 3,004,831 A | 10/1961 | Hungerford et al. .......... | 23/207 |
| 3,009,782 A | 11/1961 | Porter ........................ | 23/207 |
| 3,565,581 A * | 2/1971 | Lee .............................. | 423/589 |
| 3,761,580 A * | 9/1973 | Schreyer et al. ............. | 423/588 |
| 3,887,490 A | 6/1975 | Schreyer et al. ............. | 252/414 |
| 3,901,822 A | 8/1975 | Browning et al. .......... | 252/412 |
| 4,428,923 A | 1/1984 | Kunkel et al. ............... | 423/588 |
| 4,508,696 A * | 4/1985 | Coingt ........................ | 423/588 |
| 4,541,997 A | 9/1985 | Bengt ......................... | 423/219 |
| 4,552,748 A | 11/1985 | Berglin et al. .............. | 423/588 |
| 4,800,075 A | 1/1989 | Jenkins ........................ | 423/588 |
| 5,063,043 A * | 11/1991 | Bengtsson ................... | 423/588 |
| 5,071,634 A | 12/1991 | Maunula et al. ............. | 423/588 |
| 5,674,797 A | 10/1997 | Seppänen et al. .............. | 502/33 |
| 5,725,837 A * | 3/1998 | Turunen ..................... | 423/588 |
| 5,827,493 A * | 10/1998 | Ledon ......................... | 423/588 |
| 5,853,693 A | 12/1998 | Ogasawara et al. ......... | 423/588 |
| 5,985,235 A | 11/1999 | Nyström et al. ............. | 423/588 |
| 6,126,914 A | 10/2000 | Ogasawara et al. ......... | 423/588 |
| 6,447,744 B1 | 9/2002 | Haas et al. .................. | 423/588 |

FOREIGN PATENT DOCUMENTS

| | | |
|---|---|---|
| DE | 1 055 513 | 4/1959 |
| DE | 1 244 129 | 7/1967 |
| DE | 2 042 523 | 3/1972 |
| DE | 197 13 376 A1 | 10/1997 |
| DE | 199 53 185 A1 | 5/2001 |
| EP | 0 078 780 | 3/1986 |
| EP | 0 670 182 A1 | 9/1995 |
| EP | 0 778 085 A1 | 6/1997 |
| GB | 1 348 071 | 3/1974 |
| WO | WO 94/10085 | * 5/1994 |

OTHER PUBLICATIONS

English translation of DE 1 055 513, References B3 above.
English translation of DE 1 244 129, Reference B4 above.
English language abstract for DE 2 042 523, Reference B5 above.
English language abstract for DE 197 13 376, Reference B6 above.
English language abstract for DE 199 53 185, Reference B7 above.
EUL, et al., Hydrogen Peroxide, *Kirk-Othmer Encyclopedia of Chemical Technology*, Online, Aug. 17, 2001, XP002211258, Retrieved from the Internet: <URL:http://www.mrw.interscience.wiley.com/kirk/articles/hydrhess.a01/sect1_5fs.html>, retrieved on Aug. 27, 2002, paragraph 5.1.
Notice of Opposition to EP patent 1 485 320, filed Sep. 8, 2006.
Schroder, et al., *J. Catalysis* 132:402-408 (1991), no month.
Oinas, et al., *Chem. Eng. Proc.* 34:503-513 (1995), no month.

* cited by examiner

*Primary Examiner*—Wayne A. Langel
(74) *Attorney, Agent, or Firm*—Michael A. Sanzo

(57) ABSTRACT

The invention relates to a process for the production of hydrogen peroxide by the anthraquinone process, comprising a hydrogenation stage, an oxidation stage and an extraction stage. According to the invention, catalytic hydrogenation of anthraquinone derivatives dissolved in a working solution is carried out in the presence of added molecular oxygen. Per mol hydrogen, 0.1 to 10 mmol oxygen is preferably introduced into the hydrogenation stage with the hydrogenating gas, in mixture with an inert gas and/or dissolved and/or dispersed in the working solution. This increases the residence time of the catalyst.

11 Claims, No Drawings

PROCESS FOR THE PRODUCTION OF HYDROGEN PEROXIDE

CROSS REFERENCE TO RELATED APPLICATIONS

The present application represents U.S. national stage of international application PCT/EP03/02181, which had an international filing date of Mar. 4, 2003 and which was published in English under PCT Article 21(2) on Oct. 9, 2003. The international application claims priority to application EP 02007120.5, filed with the European Patent Office on Mar. 28, 2002.

DESCRIPTION

1. Field of the Invention

The invention relates to a process for the production of hydrogen peroxide by the anthraquinone process, by means of alternate reduction and oxidation of a working solution containing one or more anthraquinone derivatives. The invention produces an improvement in catalyst residence time in the hydrogenation stage of the process.

2. Background of the Invention

The production of hydrogen peroxide by the so-called anthraquinone process is known. This process is based on the alternate hydrogenation and oxidation of anthraquinone derivatives, conventionally 2-alkylanthraquinones and 2-alkyltetrahydroanthraquinones, the alkyl group being linear or branched and generally having 2 to 6 carbon atoms. The anthraquinone derivatives referred to, and the anthraquinone derivatives obtained in the hydrogenation stage will hereinafter be known by the general name "reactants." In the anthraquinone process, these reactants are dissolved in an organic solvent system, the solution being known as a "working solution." The working solution frequently contains two different 2-alkylanthraquinones and their tetrahydro derivatives.

In the hydrogenation stage of the anthraquinone process, the alkylanthraquinones and alkyl tetrahydroanthraquinones contained in the working solution are at least partially converted with hydrogen or a hydrogen-containing gas in the presence of a catalyst into the corresponding alkylanthrahydroquinones or alkyltetrahydroanthraquinones. The working solution is hydrogenated in the presence of a suspension catalyst, in particular a precious metal-containing suspension catalyst. Alternatively, hydrogenation of the working solution in the presence of a fixed bed catalyst arranged in a hydrogenating reactor is also known.

The hydrogenated working solution freed from catalyst is then treated with an oxygen-containing gas, conventionally with air, the alkylanthraquinones or alkyltetrahydroanthraquinones being re-converted and hydrogen peroxide being formed at the same time.

Hydrogen peroxide is then isolated from the oxidised working solution. This is mostly an extraction step, hydrogen peroxide being extracted with an aqueous solution and this solution then being purified and concentrated. The working solution is returned to the hydrogenation stage. The anthraquinone process generally also includes process stages from the working solution regeneration and catalyst regeneration series. A summary of the anthraquinone process for the production of hydrogen peroxide and various embodiments of individual stages can be found in Ullmann's Encyclopedia of Ind. Chem., $5^{th}$ ed., Vol. A 13, P. 447–456.

The activity, productivity and residence time of the hydrogenating catalyst and the selectivity with which it hydrogenates the anthraquinone derivatives are crucial to the economy of the anthraquinone process.

When using suspension catalysts, such as palladium black or supported palladium catalysts for example, the catalyst de-activation in the hydrogenation stage is taken into account by periodically or continuously separating part of the catalyst from the working solution, regenerating it outside of the actual process and returning it to the hydrogenation stage. Although this catalyst separation and external regeneration is technically expensive, it avoids the reduction in capacity that results when a plant is shut down for catalyst regeneration.

The use of fixed bed catalysts in the hydrogenation stage is also known:

In the process according to U.S. Pat. No. 3,009,782 a fixed bed with catalyst particles bound to a support is used in the hydrogenation stage and as a result, fewer by-products are formed and selectivity is thereby increased.

Although the monolithic honeycomb-shaped fixed bed catalyst used in the hydrogenation stage of the process according to U.S. Pat. No. 4,552,748 and the static mixer coated with catalyst used according to U.S. Pat. No. 5,071,634 produce an acceptable catalyst residence time, here too the fixed bed reactor must be regenerated periodically to increase activity again.

Finally, in the process according to DE 19953185 the catalyst residence time of a fixed bed reactor filled with a catalyst in particle form is increased by operating the fixed bed reactor as an upward current bubble column.

A disadvantage of all of the variants of fixed bed hydrogenation described by way of example above, is that in spite of improved catalyst residence times, the de-activated catalyst must periodically be regenerated. The catalyst is regenerated or re-processed either by removing the catalyst from the reactor for external processing or, no less expensively, by shutting down the reactor and regenerating the de-activated catalyst without removing it. Interrupting production for regeneration can be avoided if several hydrogenating reactors are installed, each of which is used in turn for hydrogenation and for regeneration. However this increases the investment costs of such a production system and reduces its economy.

Attempts were made to reduce the problem of limited catalyst residence time by selecting special catalyst recipes with a low de-activation rate. Thus U.S. Pat. No. 4,800,075 discloses the use of a palladium catalyst on an alpha aluminium oxide support with a BET specific surface area of 5–108 m2/g and DE-OS 19713376 discloses the use of a palladium catalyst on a silica support with an average pore diameter of 80–400 Angstrom. However, even here, provision must be made in an industrial production plant for catalyst regeneration.

According to EP 0778085 A1, a hydrogenating catalyst can be regenerated and activated by treatment of the catalyst with an acid. However, this regeneration is either carried out externally or requires operation to be interrupted and also leads to the use of alien chemicals.

In the process according to EP 0670182 A1, according to which the de-activated hydrogenating catalyst is regenerated in the hydrogenating reactor by bringing it into contact for several hours with oxidised working solution, the hydrogen feed and thus hydrogenation must also be suspended.

In the process according to U.S. Pat. No. 3,004,831 the de-activated catalyst is regenerated by periodically reducing the hydrogen pressure in the hydrogenation stage and passing an inert gas through the reactor for a sufficient period of time. This process thus requires operation to be suspended.

Only in the process according to DE-OS 20 42 523 can the selectivity and activity of the hydrogenating catalyst be maintained over a long period without interrupting the hydrogenation reaction, by means of in situ regeneration which is carried out using a working solution to be hydrogenated which contains at least 250 mg/l, in particular 300 to 1000 mg $H_2O_2$/l reactive hydrogen peroxide. The required quantity of hydrogen peroxide can be set by partial extraction of the oxidised working solution or by adding an appropriate quantity of oxidised working solution to a fully-extracted working solution. The disadvantage of this process is that feeding part of the previously-formed hydrogen peroxide into the hydrogenation stage reduces the yield.

DESCRIPTION OF THE INVENTION

An object of the present invention is to demonstrate an improvement in the hydrogenation stage of the anthraquinone process for the production of hydrogen peroxide, which increases the catalyst residence time without suspending hydrogenation and without having to use previously-formed hydrogen peroxide.

A further object is that the process should be simple to carry out and should require no alien auxiliary substances.

A further object is that the catalyst residence time should be increased in particular in fixed bed reactors, including in a trickle bed reactor or a bubble column reactor, because with these embodiments the hydrogen peroxide taken in with the working solution is obviously not effective over the whole area of the reactor.

The objects mentioned above and other objects arising from the description that follows, can be achieved by the process according to the invention, according to which the the working solution is hydrogenated in the presence of a small quantity of added elemental oxygen.

A process for the production of hydrogen peroxide by the anthraquinone process was found, comprising a hydrogenation stage, in which anthraquinone derivatives contained in a working solution are hydrogenated with a hydrogen-containing gas in the presence of a hydrogenating catalyst, an oxidation stage, in which the anthrahydroquinone derivatives formed in the hydrogenation stage are re-converted into anthraquinone derivatives with an oxygen-containing gas, in particular air, with the formation of hydrogen peroxide, isolation of the hydrogen peroxide from the oxidised working solution and return of the working solution to the hydrogenation stage, which is characterised in that hydrogenation is carried out in the presence of added molecular oxygen ($O_2$), in a quantity of at least 0.02 mmol $O_2$ per mol $H_2$ which is below the explosion limit under the hydrogenation conditions and which is introduced into the hydrogenaton stage in the form of an oxygen-containing gas. The sub-claims relate to preferred embodiments of the process according to the invention.

Molecular oxygen, or preferably air, is fed into the hydrogenating reactor at one or more points, either directly or together with the hydrogen-containing hydrogenating gas and/or in mixture with an inert gas, such as further nitrogen, and/or with a working solution to be hydrogenated, which has previously been charged with oxygen. The latter can be obtained by bringing the extracted working solution into contact with air or oxygen. When dosing the oxygen or air into the hydrogenating gas or into the hydrogenating reactor, it must be ensured that no critical explosion ranges are crossed, even locally. By purifying previously-produced hydrogen accordingly, the quantity of oxygen required according to the invention can be incorporated into the hydrogen. The upper limit of the oxygen content is determined solely by safety requirements (explosion limit); the minimum quantity is measured in such a way as to bring about an effective increase in catalyst residence time. Surprisingly, by using the measures according to the invention, the residence time of the catalyst is significantly increased.

The quantity of oxygen used is at least 0.02 mol $O_2$/mol $H_2$ and is preferably in the range from 0.1 to 20 mmol $O_2$ per mol hydrogen, although the levels may be below or above these limits. In particular, the quantity used is preferably in the range from 0.5 to 10 mmol $O_2$ per mol hydrogen. If the hydrogenating gas consists substantially of hydrogen and the oxygen is introduced into the hydrogenating reactor with the hydrogen, this mixture preferably contains 100 to 20,000 vpm $O_2$ (vpm=volume parts per million). If oxygen is introduced into the hydrogenating reactor with the working solution to be hydrogenated, the oxygen can be dissolved and/or finely dispersed therein.

Depending on the composition of the working solution, the extraction conditions and subsequent treatment, such as drying under reduced pressure, the working solution fed into the hydrogenating reactor can still contain a small quantity of hydrogen peroxide. It is assumed that this hydrogen peroxide can be decomposed to water and oxygen in the presence of the hydrogenating catalyst and additionally exerts a certain influence on the increase of the catalyst residence time. By adding elemental oxygen according to the invention, in other words oxygen that does not originate from the hydrogen peroxide still present in the working solution, the catalyst residence time is further improved. This effect is particularly clear if the hydrogenating reactor is a fixed bed formed from catalyst in particle form and the reactor is operated as a bubble column or trickle bed.

Although R. Willstätter et. al. in Chemische Berichte 54B, 113–123, (1921) reported that the catalytic hydrogenation of anhydrides, aromatic acids and cinnamic acid esters with platinum or palladium catalysts is accelerated in the presence of oxygen, oxygen has surprisingly never before been introduced into the hydrogenation stage of the anthraquinone process for the production of hydrogen peroxide.

The known reaction supports, catalysts and process variants of hydrogenation as well as the known solvents for the working solution can be used in the process according to the invention.

Particularly suitable reactants are 2-alkylanthraquinones and their core hydrogenated 2-alkyltetrahydroanthraquinones, the alkyl group having two to six carbon atoms and being either linear or branched. A combination containing 2-ethylanthraquinone and a $C_4$- to $C_6$-alkylanthraquinone and their tetrahydro derivatives is preferably used as the reactant. The working solution contains one or more solvents, in which both the anthraquinone derivatives and the anthrahydroquinone derivatives are highly soluble.

The catalysts conventionally used in the anthraquinone process can be used in the process according to the invention. These are preferably precious metal-containing catlysts, in particular palladium-containing catalysts. The catalytically-active component may be present in free or supported form or as a constituent of a coating on a honeycomb reactor or on a static mixer.

Hydrogenation is carried out by the method known per se with regard to temperature and pressure and the flow ratios and thus contact time in the reactor. The temperature is mostly in the range from 10 to 100° C., in particular 40 to 80° C., the pressure in the range 0.01 to 2 mPa, in particular 0.1 to 0.7 mPa. Hydrogenation can be carried out in known reactors for suspension hydrogenation or fixed bed hydrogenation.

According to a preferred embodiment the dimensions of the reactor are such and the hydrogenation conditions are set in such a way that the hydrogen fed into the reactor is completely consumed on its way through the reactor.

Advantages of the process according to the invention are that the residence time of the catalyst is significantly higher than that of the previously-known operating method, that there is no need for a costly hydrogenation reactor construction, that the process can be used both for fixed bed and suspension hydrogenation, although fixed bed hydrogenation is particularly advantageous, and the hydrogenation stage is not bound to a particular composition of the working solution and/or hydrogenating catalyst.

The invention is further explained by the following examples (B) and reference examples (VB).

EXAMPLES

Hydrogenation was carried out continuously in a reaction tube with 5 ml catalyst bulk volume. The reactor was 10 mm in diameter. The unit consisted of a liquid receiver, the reactor and a liquid separator. The reaction temperature was set by means of a heat exchanger-oil circulation. The pressure and hydrogen stream were regulated electronically. The working solution was dosed into a hydrogen stream with a pump and the mixture was released from the top of the reactor (trickle-bed method). After passing through the reactor, the product was removed from the separator at regular intervals.

The working solution, which was withdrawn from an anthraquinone circulation process after the extraction stage, contained alkyl aromatics and tetrabutylurea as solvents and a mixture of 2-alkylanthraquinones and their 2-alkyltetrahydroanthraquinones in a molar ratio of 1:3.2 as reactants.

The reactor overpressure in the examples and reference examples was in each case 0.2 mPa. The LHSV liquid charge was 10 h$^{-1}$ and the reactor temperature 76° C. in all cases. The hydrogen-containing gas stream fed into the reactor was 4 Nl/h in all cases.

Hydrogen which, according to the manufacturer's information, contained oxygen in the range<10 vpm was used as hydrogenating gas in reference examples VB 1.1 to VB 1.5. Hydrogen enriched to an oxygen content of 3000 vpm was used in the examples according to the invention B 1.1 to B 1.5.

The catalyst used was a supported catalyst, namely palladium on SiO$_2$ (Aerolyst, Degussa). The particle size distribution of the granular supported catalyst was 1.0–1.4 mm.

An aqueous palladium nitrate solution was used to charge the support. 50 g of the support material was placed into a coating pan and a solution of 200 g water und 270 mg palladium nitrate was poured on whilst the pan rotated. The coated support was air-dried at 170° C. for 12 h. The catalyst was then reduced in the reactor with hydrogen (<10 vpm O$_2$) at 100° C. for 2 h.

Table 1 below shows the results of examples B 1.1 to B 1.5 according to the invention and reference examples VB 1.1 to VB 1.5. The H$_2$O$_2$-equivalent is given as a measure of hydrogenation as a function of the operating period.

TABLE

| No. | Operating period [h] | H$_2$O$_2$-equivalent [g/l] |
|---|---|---|
| VB 1.1 | 1 | 9.1 |
| VB 1.2 | 21 | 4.3 |
| VB 1.3 | 43 | 2.2 |
| VB 1.4 | 120 | 0.7 |

TABLE-continued

| No. | Operating period [h] | H$_2$O$_2$-equivalent [g/l] |
|---|---|---|
| VB 1.5 | 146 | 0.5 |
| B 1.1 | 2 | 7.9 |
| B 1.2 | 23 | 5.8 |
| B 1.3 | 42 | 4.9 |
| B 1.4 | 119 | 3.8 |
| B 1.5 | 145 | 3.6 |

The tests show that for the operating period selected, the H$_2$O$_2$ equivalent of the embodiment according to the invention remains virtually constant after an initial loss of activity. With the previously-known embodiment, in other words hydrogenation without a quantity of oxygen active according to the invention, the loss of activity is many times greater and no constant value is achieved, the loss of activity continuing until full de-activation.

Reference Examples 2.1 to 2.5

These examples were carried out in the same way as reference example 1, although a non-extracted oxidised working solution was added to the extracted working solution before the hydrogenation stage, so that the mixture had an H$_2$O$_2$ equivalent in the range from 0.5 to 0.3 g/l. The results are shown in Table 2.

TABLE 2

| No. | Operating period [h] | H$_2$O$_2$ equivalent in the receiver [g/l] | H$_2$O$_2$ equivalent after hydrogenation [g/l] |
|---|---|---|---|
| VB 2.1 | 1 | 0.5 | 9.7 |
| VB 2.2 | 23 | 0.5 | 7.7 |
| VB 2.3 | 47 | 0.4 | 6.3 |
| VB 2.4 | 119 | 0.5 | 3.5 |
| VB 2.5 | 143 | 0.3 | 2.8 |

These reference examples show that although the addition of H$_2$O$_2$ to the working solution to be hydrogenated improves the residence time of the catalyst, the effect is far less than that obtained by the process according to the invention and, once again, the previously-known process uses pre-formed h$_2$O$_2$.

What is claimed is:

1. In a process for the production of hydrogen peroxide, comprising:
    a) a hydrogenation stage reaction comprising the hydrogenation of an anthraquinone derivative with a hydrogen-containing gas in the presence of a hydrogenating catalyst to form an anthrahydroquinone derivative, said anthraquinone derivative and anthrahydroquinone derivative being contained within a working solution;
    b) an oxidation stage reaction comprising the reconversion of said anthrahydroquinone of step a) back to said anthraquinone derivative using an oxygen-containing gas, said reconversion being accompanied by the formation of hydrogen peroxide; and
    c) an extraction stage comprising isolating said hydrogen peroxide formed in step b) and then returning the working solution to said hydrogenation stage reaction, the improvement comprising adding molecular oxygen (O$_2$) in the form of a gas containing molecular oxygen as a component to said hydrogenation stage reaction in a quantity of at least 0.02 mmol $O_2$ per mole $H_2$ and less than the explosion limit under the hydrogenation conditions.

2. The process of claim 1, wherein said molecular oxygen is added to said hydrogenation step reaction in a form selected from the group consisting of: $O_2$ alone; air alone; $O_2$ or air in mixture with said hydrogen-containing gas of said hydrogenation stage reaction; and $O_2$ or air in mixture with an inert gas.

3. The process of claim 1, wherein said molecular oxygen is added to said hydrogenation stage reaction in a quantity of 0.1 to 20 mmol $O_2$ per mole of hydrogen.

4. The process of claim 3, wherein molecular oxygen is added in a quantity of 0.5 to 10 mmol of $O_2$ per mole of hydrogen.

5. The process of claim 1, wherein said hydrogen-containing gas in said hydrogenation stage reaction has an oxygen content of 100 vpm (volume parts per million) to 5000 vpm.

6. The process of claim 1, wherein said hydrogenation stage reaction is carried out in a fixed bed reactor with an LHSV (liquid hourly space velocity) of 0.1 $h^{-1}$ to 20 $h^{-1}$.

7. The process of claim 1, wherein a precious metal-containing fixed bed catalyst of particles having an average diameter of 0.5–20 mm is used for said process.

8. The process of claim 7, wherein said fixed bed catalyst contains palladium.

9. The process of claim 6, wherein said fixed bed reactor is operated as a trickle bed.

10. The process of any one of claim 1–9, wherein, after the isolation of said hydrogen peroxide in said extraction stage, said working solution is brought into contact with said molecular oxygen or gas containing molecular oxygen before being returned to said hydrogen stage reaction.

11. The process of any one of claims 1–9, wherein said molecular oxygen or gas containing molecular oxygen is added directly to a reactor in which said hydrogenation stage reaction is taking place, said addition occurring after the isolation of said hydrogen peroxide, and wherein said addition is made in a quantity of 0.1 to 20 mmol of $O_2$ per mole of hydrogen.

* * * * *